(12) United States Patent
Deger et al.

(10) Patent No.: US 6,415,838 B1
(45) Date of Patent: Jul. 9, 2002

(54) ANTI-SKID DEVICE

(75) Inventors: Werner Deger, Lauchheim; Helmut Kaiser, Aalen-Unterkochen; Thilo Ernst Schaffert, Obersontheim; Eugen Liesch, Aalen-Unterkochen, all of (DE)

(73) Assignee: RUD- Kettenfabrik Rieger & Dietz GmbH u. Co., Aalen- Unterkochen (DE)

( * ) Notice: Subject to any disclaimer, the term of this patent is extended or adjusted under 35 U.S.C. 154(b) by 0 days.

(21) Appl. No.: 09/622,724

(22) PCT Filed: Mar. 19, 1999

(86) PCT No.: PCT/DE99/00914

§ 371 (c)(1),
(2), (4) Date: Aug. 21, 2000

(87) PCT Pub. No.: WO99/47371

PCT Pub. Date: Sep. 23, 1999

(30) Foreign Application Priority Data

Mar. 20, 1998 (DE) .......................... 198 13 829

(51) Int. Cl.⁷ ............................................... B60C 27/10
(52) U.S. Cl. ..................................... 152/233; 152/217
(58) Field of Search ............................... 152/171, 173, 152/185, 213 R, 217, 219, 231, 233

(56) References Cited

U.S. PATENT DOCUMENTS

| | | | |
|---|---|---|---|
| 1,786,229 A | | 12/1930 | Conrow |
| 2,925,113 A | | 2/1960 | Kennard |
| 4,588,010 A | * | 5/1986 | Melzi et al. ............. 152/213 A |
| 5,082,039 A | * | 1/1992 | Franklin ...................... 152/219 |
| 5,236,025 A | * | 8/1993 | Maresh ........................ 152/219 |

FOREIGN PATENT DOCUMENTS

| | | |
|---|---|---|
| DE | 4225802 | 2/1994 |
| DE | 19702815 | 11/1998 |

\* cited by examiner

Primary Examiner—Russell D. Stormer
(74) Attorney, Agent, or Firm—Mark P. Stone

(57) ABSTRACT

An anti-skid device has rotating chains which are connected to an inner and an outer fixing device. The outer fixing device is formed from a ring-shaped disc (10) and a retainer ring (11). The retainer ring is provided for the end of a tensioning chain (8) which serves to lock or tension the inner fixing device formed by a spring steel clip. The disc (10) and the retainer ring (11) are detachably connected to each other for enabling the rotating chains (3, 4, 5, 6, 7) of the anti-skid device to turn.

22 Claims, 6 Drawing Sheets

ANTI-SKID DEVICE

The invention relates to an anti-skid device having a running net which is connected to an inner and an outer fixing device at a plurality of connecting points by means of connecting elements, and having a tensioning chain which serves to shorten the circumference of the inner fixing device and runs from the inner fixing device to the outer fixing device.

An anti-skid device of the above type is known from DE 42 25 802 C2. In the known anti-skid device, the outer fixing device is formed by an enclosed side chain which is provided with guide eyelets for the tensioning chain and whose end has a hook which can be engaged in an element of the side chain. Not only are the chains of the anti-skid device connected to the outer fixing device but also, via connecting elements, a ring-shaped disc which serves to protect the rim of the vehicle wheel and comes to rest between the edge of the tire and the outer fixing device and the tensioning chain.

While the disc is detachably connected to the outer fixing device in the abovementioned known anti-skid device, it itself forms, in an anti-skid device which is disclosed in the non-prepublished, older application 197 02 815.2-16 (cf. DE 197 02 815 C1), together with a retainer ring, the outer fixing device. The retainer ring is formed in this case of a coil which is securely connected to the ring-shaped disc via spoke-like webs, the connecting elements for the running net engaging on the outer edge of said disc. The older solution provides not only the advantage of a flat design but also a possibility of accommodating the end of the tensioning chain which eliminates the risk of damage to the vehicle rim. If it is, nonetheless, not completely satisfactory, the reason for this is that turning the running net, which is desired to increase the running performance of tithe anti-skid device, is virtually impossible with it.

The invention is based on the object of remedying the certified deficiency and providing an anti-skid device with an outer fixing device which is formed by a disc and a retainer ring and which permits the running net to be turned without the connecting elements having to be separated from the outer fixing device. this object is achieved according to the invention in that the outer fixing device has a disc and a retainer ring for the end of the tensioning chain, and in that the retainer ring is detachably connected to the disc. In order to turn the running web in the anti-skid device according to the invention, the user of the device merely needs to release the retainer ring from one of the side faces of the disc and attach it again to the other side face of the disc.

Figure 1:
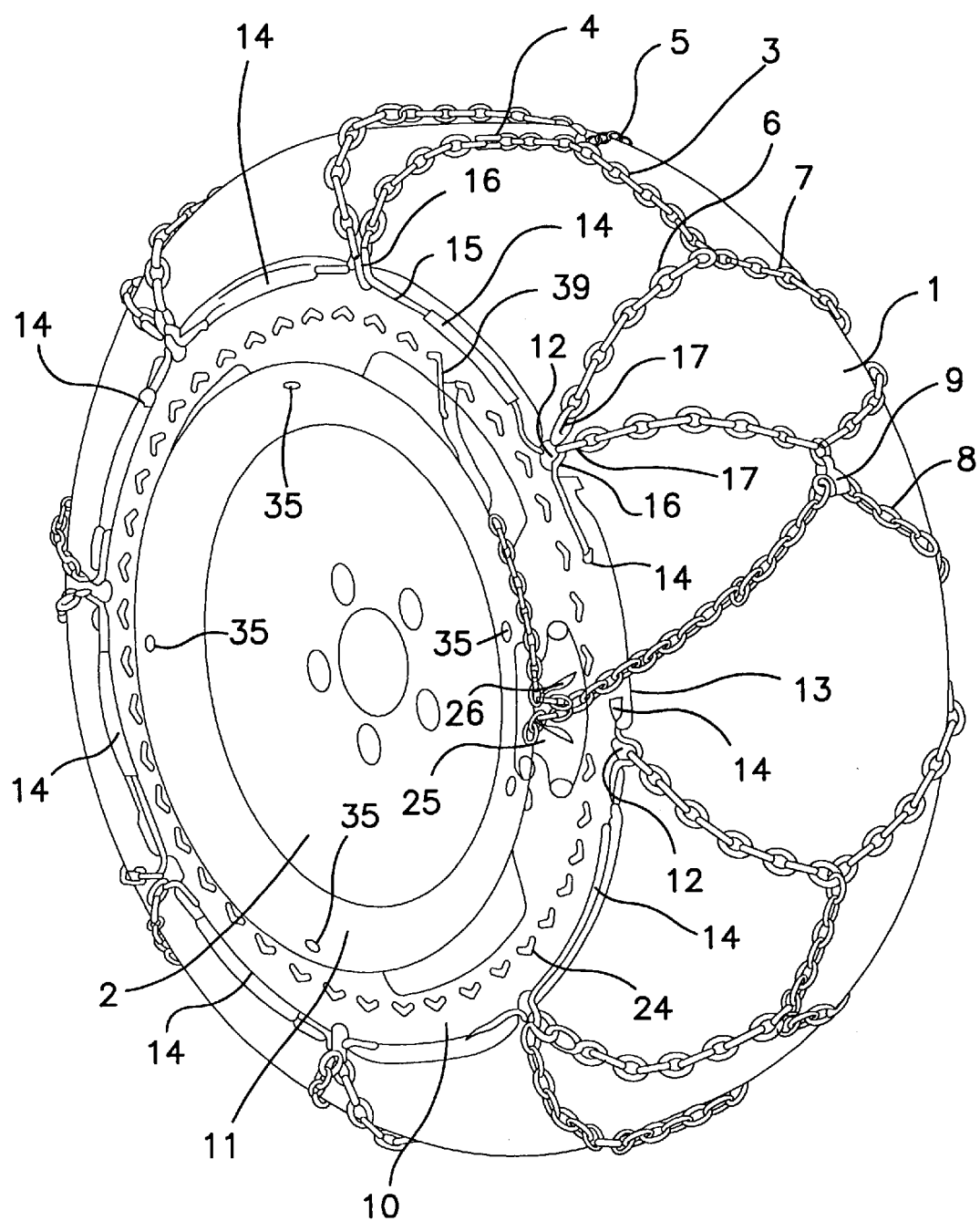
Figure 2:
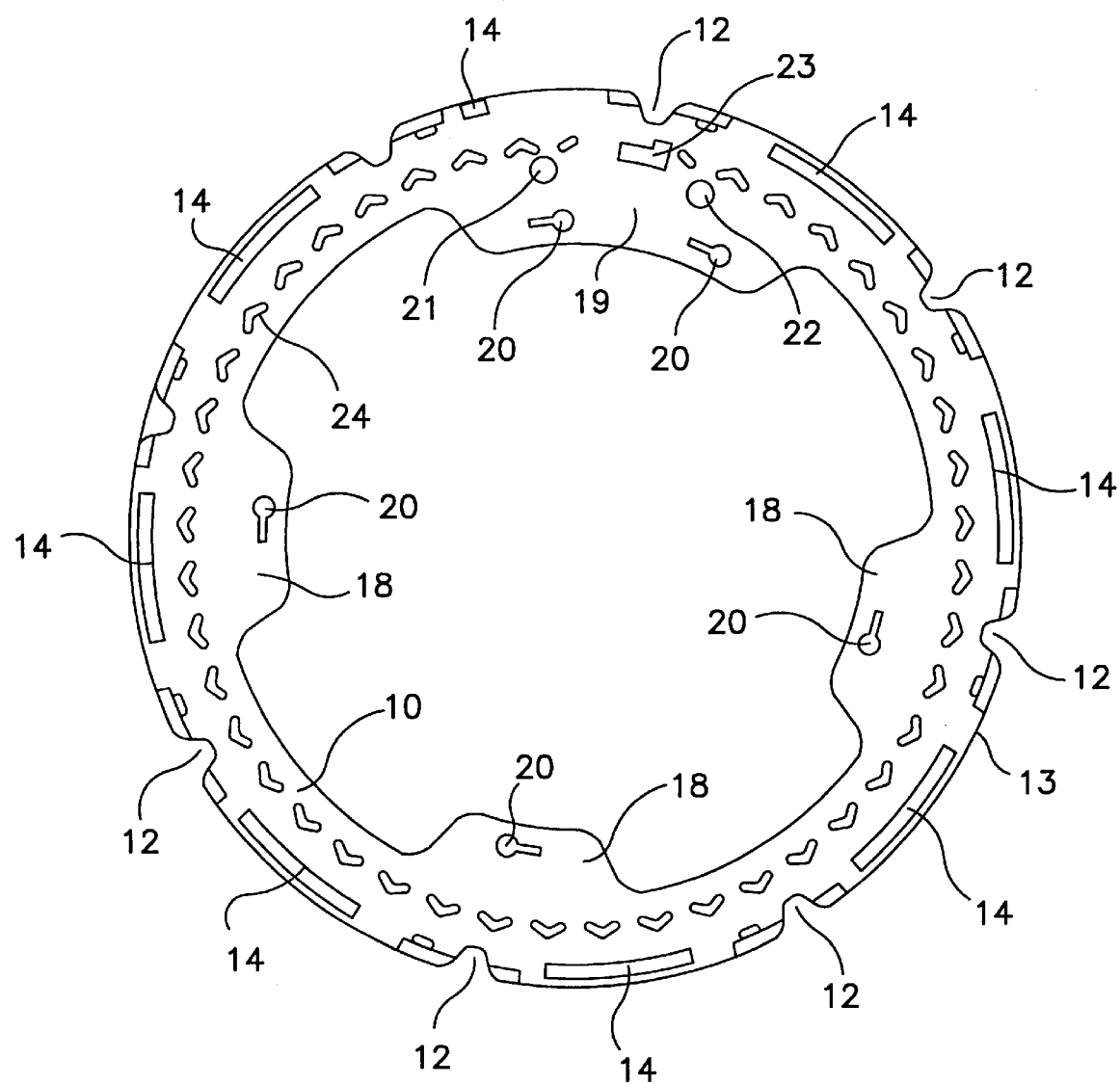
Figure 4:
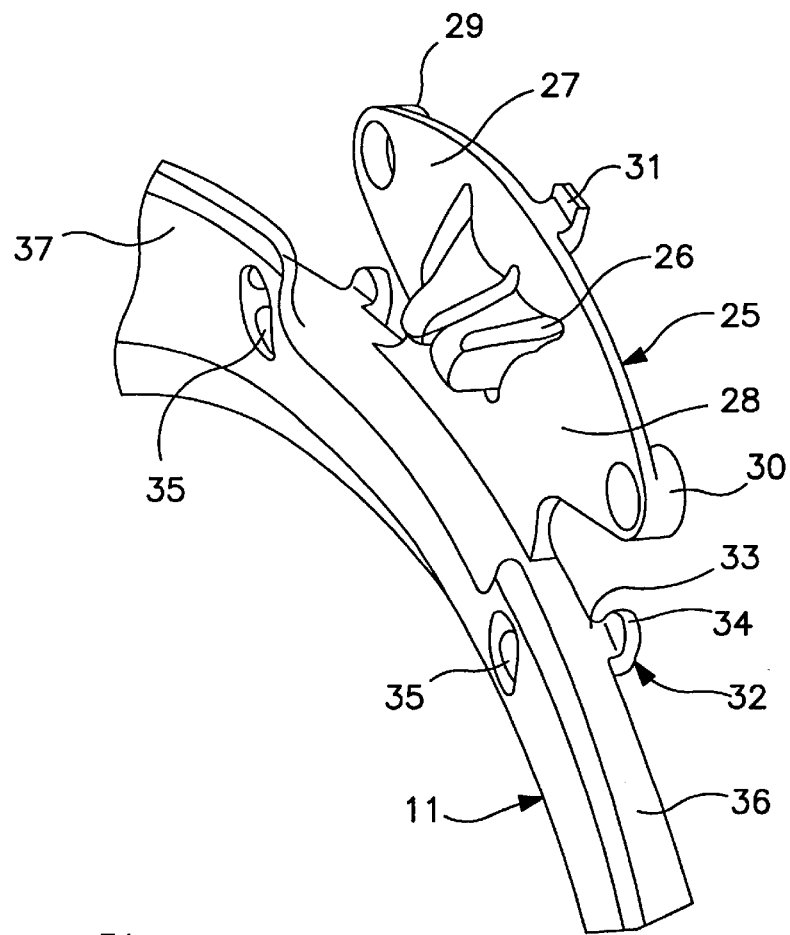
Figure 3:
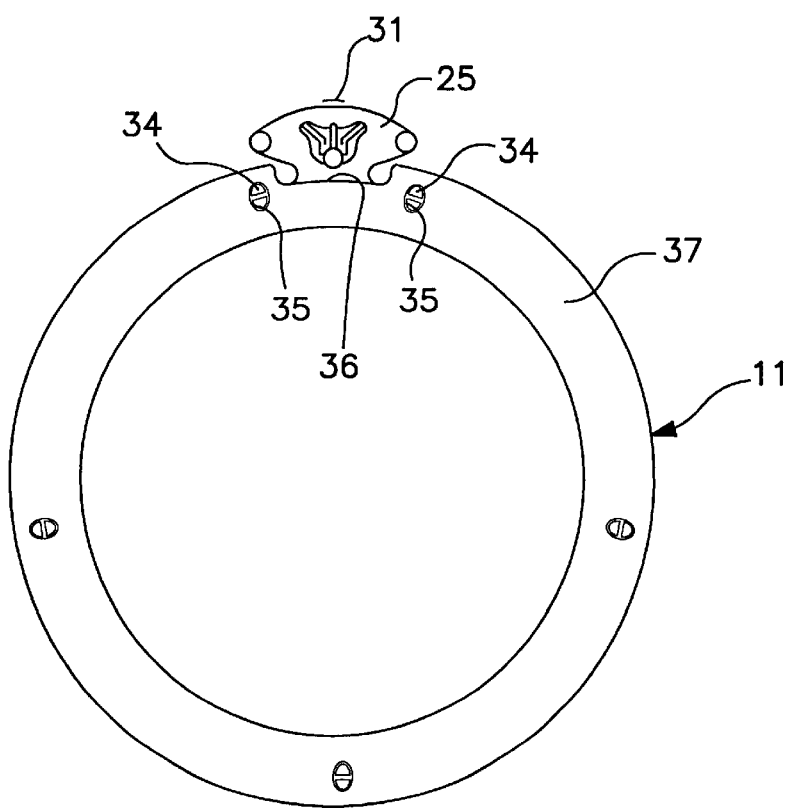
Figure 5:
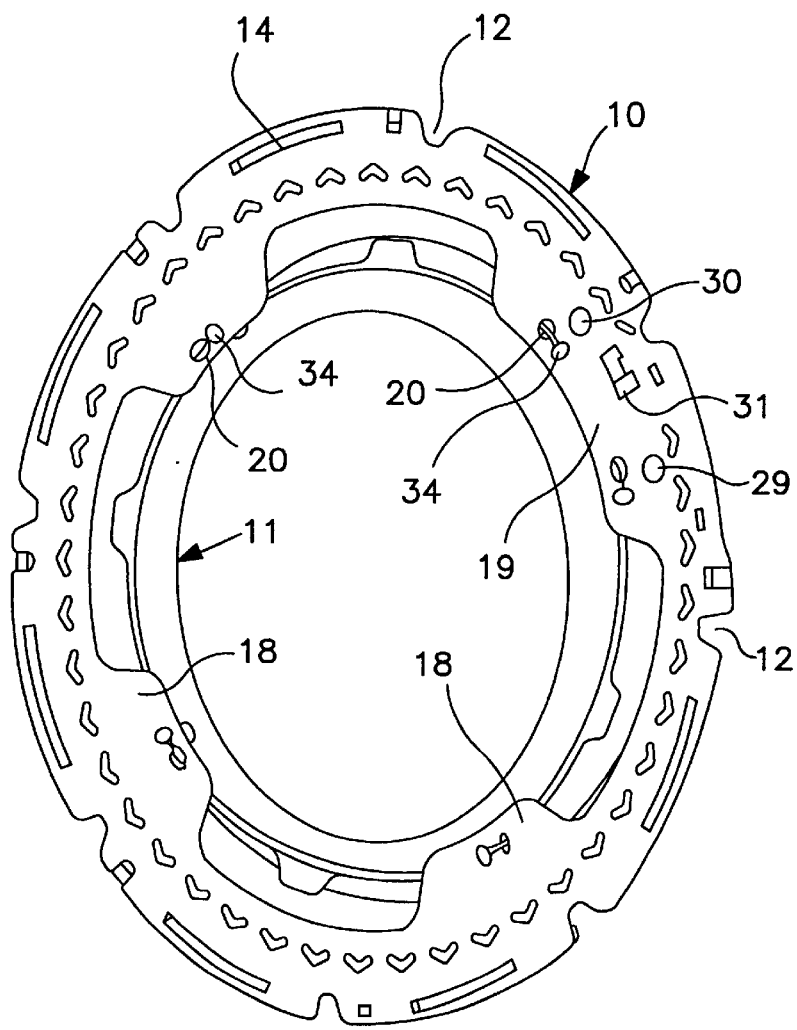
Figure 6:
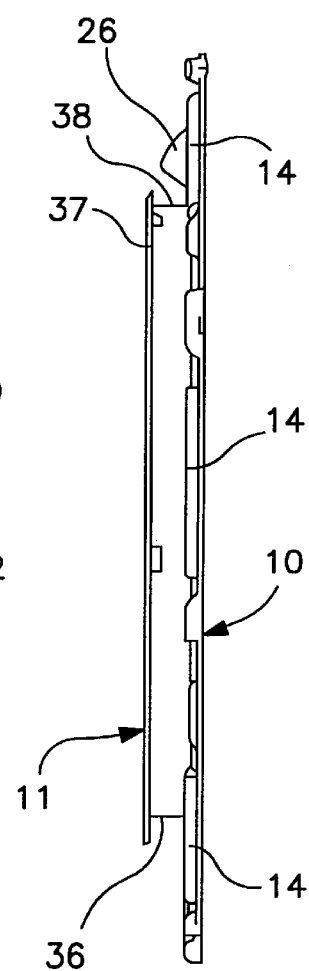
Figure 7:
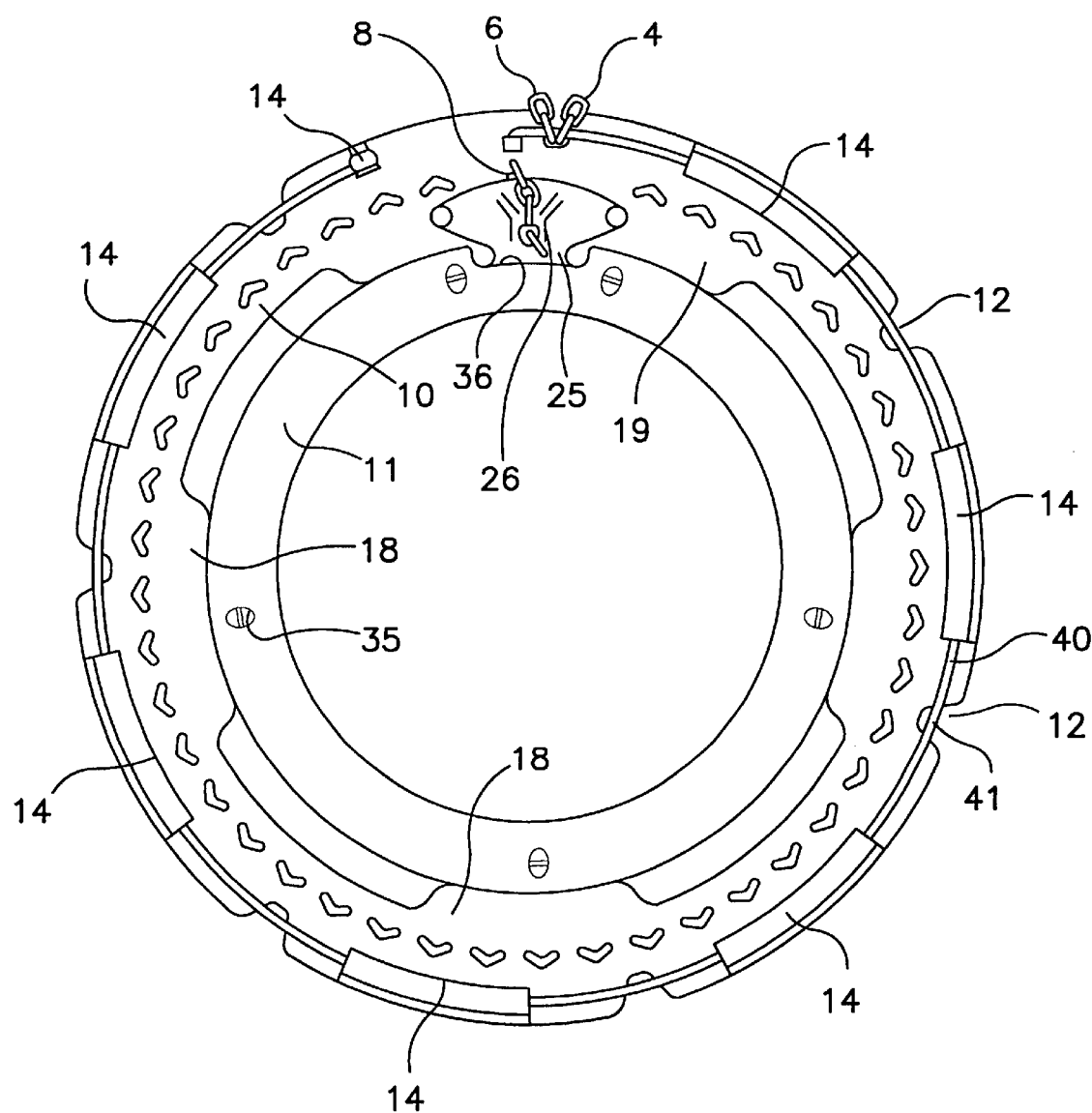
Figure 8:
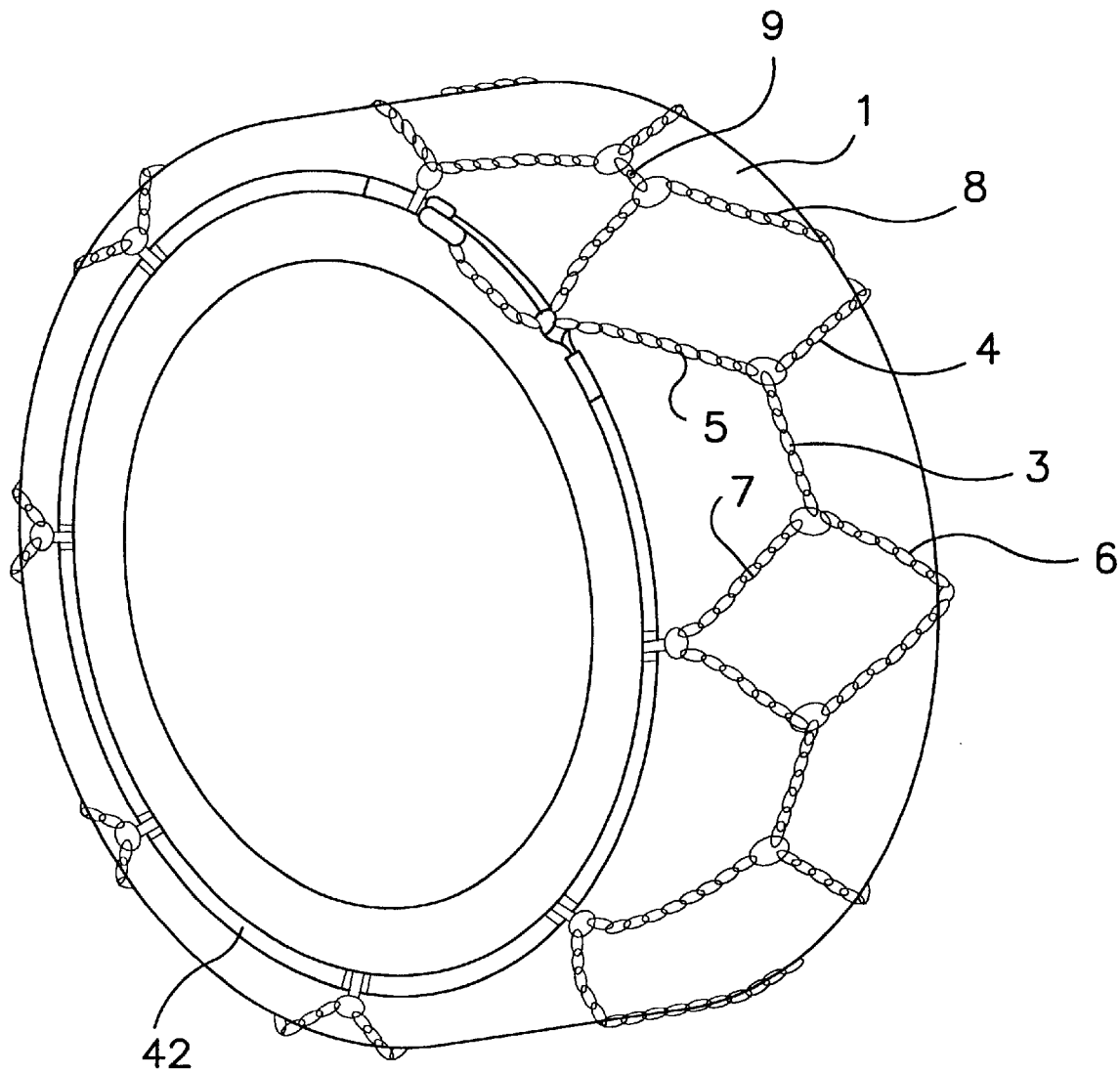

Further details and features of the invention emerge from the subclaims and from the following description of a particularly advantageous embodiment of the invention which is illustrated in the appended drawing, in which:

FIG. 1 shows the perspective view of an anti-skid device which is fitted onto a vehicle tire, FIG. 2 shows the front view of a disc which forms part of the outer fixing device, FIG. 3 shows the front view of a retainer ring which forms a further part of the outer fixing device, FIG. 4 shows a detail of FIG. 3 in an enlarged and perspective view, FIG. 5 shows, viewed obliquely from behind, the parts in FIGS. 2 and 3 which are connected to one another, FIG. 6 shows a side view of the parts according to FIG. 5 which are connected to one another, FIG. 7 shows the front view of a slightly modified outer fixing device, and FIG. 8 illustrates a chain net of an anti-skid device connected to an inner fixing device.

In FIG. 1, 1 is a vehicle tire which is fitted onto a light-alloy rim 2 and is equipped with an anti-skid device whose running web is composed essentially of chain intersections which follow one another along the tread in the circumferential direction of the tire, each of which is formed by a longitudinal chain element 3 and four oblique chain elements 4, 5, 6, 7. The oblique chain tensioning elements 5 and 7 are connected in a known fashion to an inner fixing device 42 which is formed by a spring steel strap whose ends are connected to one another by means of a tensioning chain 8 which is guided over the tread of the tire 1 to the outer fixing device-of the anti-skid device and passes through a guide eyelet 9, as illustrated in FIG. 8.

The outer fixing device includes an essentially ring-shaped disc 10 and a retainer ring 11 which is detachably connected to the latter. The two abovementioned components are expediently embodied as plastic injection-moulded components. In the vicinity of its outer edge 13 which is provided with cut-outs 12, the disc 10 has fixing projections 14 which run equidistantly to the outer edge 13 and have an essentially L-shaped cross section. The fixing projections 14 serve to fix a wire strap 15 which has sections which are bent at right angles in the vicinity of the cut-outs 12 and form fixing fittings 16 for connecting elements 17, which are formed in the illustrated case by end elements, aligned perpendicularly with respect to the edge of the tire 1, of the oblique chain elements 4 and 6.

The disc 10 which is illustrated separately in FIG. 2 has tab-like projections 18 and 19 which are directed towards the centre of the ring which the disc forms, key-shaped cut-outs 10 being arranged in the vicinity of said projections 18 and 19. The projection 19 is additionally provided with two circular holes 21, 22 and an essentially L-shaped cut-out 23. In addition, the disc 10 is equipped With V-shaped slots 24 whose limbs enclose an obtuse angle and whose tips are directed outwards.

FIG. 3 show the front view of the retainer ring 11 which is separated from the disc 10. The retainer ring 11 has an outwardly directed protrusion 25 with a fork-shaped retaining catch 26 into which an element of the tensioning chain 8 can be engaged. Details of the construction of the protrusion 25 can be gathered from FIG. 4.

FIG. 4 shows two latching cams 29, 30 which are arranged in the vicinity of shoulders 27, 28 and which can engage in sprung fashion in the holes 21 and 22 in the disc 10. In addition, the protrusion 25 is provided with a bolt 31 which serves to stabilize it and to which the cut-out 23 in the disc 10 is assigned.

Five projections 32, which are each composed of a stem 33 and a head 34, are arranged distributed over the circumference of the retainer ring 11 on its rear side. When the disc 10 and the retainer ring 11 are joined together, the projections 32 are inserted through the cut-outs 20 on the disc 10, and the retainer ring 11 is subsequently turned a small distance with respect to the disc 10 in order to move the stems 33 of the projections 32 into the U-shaped sections of the cut-outs 20, i.e. into a position in which the heads 34 of the projections 32 engage behind the disc 10. This is the position in which the latching cams 29, 30 simultaneously latch into the holes 21 and 22 in the disc 10. For reasons associated with injection moulding technology, the retainer ring 11 has oval holes 35 in the vicinity of the projections 32.

FIGS. 5 and 7 show the retainer ring 11 which is connected to the disc 10 in the manner of a bayonet closure, in an oblique view from the rear and from the side. As is clear in particular from FIG. 6, the retainer ring 11 forms the base 36 and a side wall 37 of a circumferential channel 38 whose second side wall is formed by the disc 10. The channel 38 serves to receive the end of the tensioning chain a which is to be retained when the anti-skid device is mounted. The end of the tensioning chain is, as it were, wound into the channel 38, and a retainer hook 39 which is arranged at the outermost end of the tensioning chain a and has an elastic base element is subsequently engaged in the respective next slot 24. The V-shaped design of tile slots 24 permits the user to engage the retainer hook 39 in one or other slot limb as a function of the FIG. 7 shows a slightly modified embodiment of the outer fixing device which differs from the previous solution only by virtue of the fact that the wire strap 40 is not bent at right angles in the vicinity of the cut-outs 20. The fixing fittings 41 are consequently of essentially straight design here. Using different wire straps 15 and 40 enables the same chains and an outer fixing device which is composed of the same disc 10 and the same retainer ring 11 to be used to fabricate anti-skid devices for different sizes of rim and/or tire.

What is claimed is:

1. An anti-skid device adapted to be mounted to a vehicle tire, said anti-skid device comprising a running net, an inner fixing device, an outer fixing device, and a plurality of connecting elements (17) for connecting said running net to said inner fixing device and said outer fixing device at a plurality of connecting points; said anti-skid device having a tensioning chain (8) with an end element, said tensioning chain extending between said inner fixing device and said outer fixing device for adjusting the size of the circumference of said inner fixing device; said outer fixing device comprising a disc (10) and a retainer ring (11) for receiving said end element of said tensioning chain (8), said retainer ring (11) being detachably connected to said disc (10).

2. Anti-skid device according to claim 1, wherein said retainer ring (11) forms a base (36) and one side wall (37) of a circumferential channel (38) for receiving and retaining therein said end element of said tensioning chain (8); and said disc (10) forms another side wall of said circumferential channel (38).

3. Anti-skid device according to claim 2, wherein said side wall (37) formed by said retainer ring (11) extends inwardly beyond said base (36) to said other side wall formed by said disc (10).

4. Anti-skid device according to claim 1, wherein said retainer ring (11) is provided with a plurality of projections (32), each of said projections having a stem (33) and a head (34); said disc (10) defining a plurality of keyhole shaped cut-outs (20), each of said keyhole shaped cut-outs defining a round section and an essentially U-shaped section; said projections (32) and said keyhole shaped cut-outs (20) being of sufficient dimension such that said heads (34) of said projections (32) are movable through said round sections of said keyhole shaped cut-outs (20), and said stems (33) of said projections (32) are received in said U-shaped sections of said keyhole shaped cut-outs (20), when said retainer ring (11) is connected to said disc (10).

5. Anti-skid device according to claim 4, wherein said retainer ring (11) is provided with resilient latching cams (29, 30), said disc (10) defining latching holes (21, 23), and said retainer ring (11) and said disc (10) being oriented such that said latching cams latch into said latching holes when said stems (33) of said projections (32) are received in said U-shaped sections of said keyhole shaped cut-outs (20).

6. Anti-skid device according to claim 1, wherein said retainer ring (11) has an outwardly directed protrusion (25) having a fork-like retaining catch (26) for retaining said tensioning chain (8).

7. Anti-skid device according to claim 6, wherein said protrusion (25) of said retainer ring (11) has a rear surface, said disc (10) has an outer side face, and said disc (10) and said retainer ring (11) are arranged such that said rear surface of said protrusion (25) bears against said outer side face of said disc (10) when said retainer ring (11) is connected to said disc (10).

8. Anti-skid device according to claim 6, wherein said protrusion (25) is resilient.

9. Anti-skid device according to claim 5, wherein said retainer ring has an outwardly directed protrusion (25) having a fork-like retaining catch (26) for retaining said tensioning chain (8), said protrusion (25) having lateral shoulders, and said latching cams (29, 30) being arranged on said lateral shoulders of said protrusion (25).

10. Anti-skid device according to claim 1, wherein said disc (10) is annular in shape.

11. Anti-skid device according to claim 4, wherein said disc (10) comprises a ring, said ring being provided with tab-like projections (18, 19) extending towards the center of said ring, said keyhole shaped cut-outs (20) being arranged proximate to said projections (18, 19).

12. Anti-skid device according to claim 1, wherein said end element of said tensioning chain (8) comprises a retainer hook (39), and said disc (10) defines a slot (24) for engaging said retainer hook (39).

13. Anti-skid device according to claim 12, wherein said slot (24) is essentially V-shaped and oriented relative to said disc (10) such that the tip of the V configuration of said slot faces in an direction towards an outer surface of said disc.

14. Anti-skid device according to claim 1, wherein said disc (10) has fixing fittings (16) for engaging said plurality of connecting elements (17).

15. Anti-skid device according to claim 14, wherein said disc (10) defines cut-outs (12) proximate to said connecting points for receiving said connecting elements (17).

16. Anti-skid device according to claim 15, wherein said fixing fittings (16) span said cut-outs (12), each said fixing fitting (16) being surrounded proximate to said cut-outs by a pair of said connecting elements (17) formed by chain links and oriented perpendicular to an edge of a vehicle tire when said anti-skid device is mounted to said vehicle tire.

17. Anti-skid device according to claim 15, wherein said fixing fittings (41) are essentially straight in configuration proximate to said cut-outs (12).

18. Anti-skid device according to claim 15, wherein said fixing fittings (16) are bent at right angles proximate to said cut-outs (12).

19. Anti-skid device according to claim 14, wherein a wire strap is arranged on said disc (10), said fixing fittings (16, 41) being formed by sections of said wire strap (15, 40).

20. Anti-skid device according to claim 1, wherein said disc (10) is formed from plastic.

21. Anti-skid device according to claim 1, wherein said retainer ring (11) is formed from plastic.

22. Anti-skid device according to claim 7, wherein said protrusion (25) is resilient.

* * * * *